US012433451B2

(12) United States Patent
Ait Bouziad et al.

(10) Patent No.: US 12,433,451 B2
(45) Date of Patent: Oct. 7, 2025

(54) ROASTING AND GRINDING APPARATUS FOR COFFEE BEANS

(71) Applicant: SOCIETE DES PRODUITS NESTLE S.A., Vevey (CH)

(72) Inventors: Youcef Ait Bouziad, Echandens (CH); Alfred Yoakim, St-Legier-la Chiesaz (CH)

(73) Assignee: Société des Produits Nestlé S.A., Vevey (CH)

( * ) Notice: Subject to any disclaimer, the term of this patent is extended or adjusted under 35 U.S.C. 154(b) by 442 days.

(21) Appl. No.: 18/002,539

(22) PCT Filed: Jun. 4, 2021

(86) PCT No.: PCT/EP2021/065041
§ 371 (c)(1),
(2) Date: Dec. 20, 2022

(87) PCT Pub. No.: WO2021/259617
PCT Pub. Date: Dec. 30, 2021

(65) Prior Publication Data
US 2023/0225561 A1    Jul. 20, 2023

(30) Foreign Application Priority Data

Jun. 24, 2020 (EP) .................................. 20181829

(51) Int. Cl.
*A47J 42/50* (2006.01)
*A23F 5/04* (2006.01)
(Continued)

(52) U.S. Cl.
CPC ................ *A47J 42/50* (2013.01); *A23F 5/04* (2013.01); *A23F 5/08* (2013.01); *A23N 12/083* (2013.01);
(Continued)

(58) Field of Classification Search
CPC ........ A47J 42/50; A47J 31/42; A47J 31/4492; A47J 42/46; A47J 42/52; A47J 42/40;
(Continued)

(56) References Cited

U.S. PATENT DOCUMENTS 3,153,377 A * 10/1964 Bosak ..................... A47J 31/42
99/290
4,484,064 A * 11/1984 Murray ................... A47J 42/52
219/400
(Continued)

FOREIGN PATENT DOCUMENTS

AU      2018220066      4/2019
CN      103687520       3/2014
(Continued)

OTHER PUBLICATIONS

Kuznetsova, "Brackets in the Text of a Legal Document as a Linguocognitive Phenomenon", Journal of MGU. Series: Russian Philology, vol. 03, 2015, pp. 37-43.
(Continued)

*Primary Examiner* — Drew E Becker
(74) *Attorney, Agent, or Firm* — Thorpe North & Western, LLP

(57) ABSTRACT

The invention relates to a roasting and grinding apparatus for coffee beans comprising a roasting device (50) and an associated grinding device (60); the roasting device (50) being configured for receiving coffee beans of a certain type that will be roasted, the roasting device (50) comprising reading means (53) to identify the characteristics of the coffee beans dispensed to it, the roasting device (50) further comprising a control unit configuring the roasting profile of the beans according to the characteristics retrieved from the reading means (53) and/or from the characteristics of the
(Continued)

beans in a database (51) in this control unit and/or according to the user's input; the roasted coffee beans being dispensed into a beans container (10, 20), the beans container (10, 20) comprising programmable identification means where product parameters of the roasted coffee beans of a certain type are encoded on it by an encoder (52) in the roasting device; the grinding device (60) comprising one or more housings for receiving one or more beans containers (10, 20); the grinding device (60) comprising a reader (62) to obtain the information of the product parameters of the roasted coffee beans of the one or more beans containers (10, 20); the grinding device (60) further comprising a control unit configured to adapt the grinding size and the quantity of roasted coffee beans to be delivered from the coffee beans containers (10, 20) for obtaining a certain coffee quantity and/or a certain coffee blend quantity from each beans container to be grinded according to these product parameters and/or according to a recipes database (64), and/or according to the user's input. The invention further relates to a method for roasting and grinding coffee beans using a roasting and grinding apparatus as the ones described, and to the use of such a roasting and grinding apparatus.

16 Claims, 20 Drawing Sheets

(51) Int. Cl.
| | | |
|---|---|---|
| *A23F 5/08* | (2006.01) | |
| *A23N 12/08* | (2006.01) | |
| *A23N 12/12* | (2006.01) | |
| *A47J 31/42* | (2006.01) | |
| *A47J 31/44* | (2006.01) | |
| *A47J 31/52* | (2006.01) | |
| *A47J 42/40* | (2006.01) | |
| *A47J 42/46* | (2006.01) | |
| *A47J 42/52* | (2006.01) | |

(52) U.S. Cl.
CPC ............ *A23N 12/125* (2013.01); *A47J 31/42* (2013.01); *A47J 31/4492* (2013.01); *A47J 31/52* (2013.01); *A47J 42/40* (2013.01); *A47J 42/46* (2013.01); *A47J 42/52* (2013.01)

(58) Field of Classification Search
CPC ....... A47J 31/52–5255; A47J 42/00–56; A23F 5/08; A23F 5/04–046; A23N 12/08–125
See application file for complete search history.

(56) References Cited

U.S. PATENT DOCUMENTS

| | | | |
|---|---|---|---|
| 9,427,104 | B1 | 8/2016 | Tacklind et al. |
| 11,259,557 | B2* | 3/2022 | Perentes ............... A47J 31/42 |
| 2003/0129286 | A1* | 7/2003 | Knepler ............... A47J 31/525 |
| | | | 426/231 |
| 2008/0185465 | A1 | 8/2008 | Pai |
| 2009/0130277 | A1* | 5/2009 | Bressner ............... A23N 12/08 |
| | | | 99/468 |
| 2012/0070546 | A1* | 3/2012 | Tanja ..................... A47J 31/42 |
| | | | 426/115 |
| 2013/0276637 | A1* | 10/2013 | Stordy ..................... A23F 5/02 |
| | | | 99/348 |
| 2014/0242239 | A1 | 8/2014 | Boggavarapu |
| 2014/0314921 | A1* | 10/2014 | Kuempel ............... H04L 67/10 |
| | | | 426/433 |
| 2015/0135962 | A1* | 5/2015 | Jarisch ................. G11C 7/1006 |
| | | | 235/492 |
| 2016/0338525 | A1* | 11/2016 | Fain ..................... A47J 31/002 |
| 2018/0000108 | A1 | 1/2018 | Boggavarapu |
| 2018/0296038 | A1* | 10/2018 | Bredius .................. A47J 42/52 |
| 2019/0082881 | A1* | 3/2019 | Steber ................. A47J 31/4403 |
| 2019/0208798 | A1* | 7/2019 | Voges ....................... A23F 5/04 |
| 2019/0231146 | A1* | 8/2019 | Dubief .................... A47J 42/52 |
| 2019/0254468 | A1* | 8/2019 | Vaaranmaa ............... A23F 5/04 |
| 2020/0315401 | A1* | 10/2020 | Deuber ................... A47J 42/56 |
| 2021/0219770 | A1* | 7/2021 | Deuber ................... A47J 31/42 |
| 2021/0386245 | A1* | 12/2021 | Dayton ............ G06Q 10/06315 |
| 2022/0079204 | A1* | 3/2022 | Dubief ................... A23N 12/08 |
| 2023/0087585 | A1* | 3/2023 | Tessicini ................ A47J 31/06 |
| | | | 99/286 |
| 2023/0240471 | A1* | 8/2023 | Ait Bouziad .......... B65D 81/32 |
| | | | 426/231 |
| 2023/0255252 | A1* | 8/2023 | Ait Bouziad .......... A23N 12/08 |
| | | | 426/233 |
| 2023/0255394 | A1* | 8/2023 | Ait Bouziad ....... A47J 31/4492 |
| | | | 426/231 |
| 2023/0337850 | A1* | 10/2023 | Pugliese ............. A47J 31/4492 |

FOREIGN PATENT DOCUMENTS

| | | |
|---|---|---|
| CN | 104379033 | 2/2015 |
| CN | 106457503 | 2/2017 |
| CN | 106998948 | 8/2017 |
| CN | 109640682 | 4/2019 |
| CN | 109788873 | 5/2019 |
| DE | 102007017385 | 11/2008 |
| EP | 2314188 A1 | 4/2011 |
| KR | 20180133389 A | 12/2018 |
| KR | 20190069397 A | 6/2019 |
| RU | 2017140649 A | 5/2019 |
| WO | 2015110337 A1 | 7/2015 |
| WO | 2017178393 | 10/2017 |
| WO | 2017186531 | 11/2017 |
| WO | 2018069182 | 4/2018 |
| WO | 2019122397 A1 | 6/2019 |

OTHER PUBLICATIONS

Japanese Office Action for Appl No. 2022-575441 dated Sep. 10, 2024, 3 pages.

* cited by examiner

ROASTING AND GRINDING APPARATUS FOR COFFEE BEANS

CROSS REFERENCE TO RELATED APPLICATIONS

The present application is a National Stage of International Application No. PCT/EP2021/065041, filed on Jun. 4, 2021, which claims priority to European Patent Application No. 20181829.1, filed on Jun. 24, 2020, the entire contents of which are being incorporated herein by reference.

FIELD OF THE INVENTION

The present invention relates to an apparatus for roasting and grinding coffee beans, and to an associated method for roasting and grinding.

TECHNICAL BACKGROUND

In all domains of food and beverage preparation, the quality of the prepared food or beverage requires, at least: adequate quality of the raw product; right tools (machines, devices, etc.) and knowledge and skills to ensure the right preparation processes.

Hot beverage preparation, more particularly coffee preparation and its derivates, also obey the same rules.

Since the very first invention of a coffee extraction machine, the associated techniques have heavily evolved during the last decades. It is known in the state of the art that the first machine for making espresso was built and patented in 1884 by Angelo Moriondo of Turin, Italy. An improved design was later patented on Apr. 28, 1903, by Luigi Bezzera. The founder of the La Pavoni company bought the patent and from 1905 produced espresso machines commercially on a small scale in Milan. Multiple machine designs have been created to produce espresso. Several machines share some common elements, such as a group head and a portafilter. An espresso machine may also have a steam wand which is used to steam and froth liquids (such as milk) for coffee drinks such as cappuccino and caffe latte.

Present techniques for preparing a coffee beverage involve a skilled person (called a Barista) and dedicated machines/devices to prepare the said coffee beverage. Typically in roast and ground (R&G) coffee, Baristas have the knowledge and the science of coffee to ensure the quality of the prepared cup depending on type of beverage to the prepared, the type of coffee used and the material/means used in the mentioned preparation.

Typically, depending on the type of coffee beverage to prepare (espresso, drip coffee type, cold brew, etc.), as well as on the method of extraction used (drip, Chemex, espresso machine, etc.), the Barista chooses the type of coffee (origin, roasting level, etc.), as well as the setting of each machine in the preparation method (the grinder parameters, the extraction method, the water temperature, etc.). In other words, all relies on the knowledge of the Barista, so these types of preparations need a skilled or trained person to ensure that all parameters are correctly set and that the right procedure is followed during the preparation.

The main object of the present invention is to achieve similar end results of the coffee beverage delivered than those obtained when using a capsule system without the need of using any single serve packaging, and without any specific skills being needed. The invention achieves this by building a system comprising several main-devices that communicate between themselves via accessory-devices, that transfer/communicate the required parameters in order to replace a Barista know-how by an artificial intelligence (AI) system.

The system of the invention adjusts the parameters of each main-device (the inputs), according to the outputs of the main-device used in the previous phase. The goal is to ensure the integrity of the procedure and the information by communicating the right parameters to be used.

Fully automatic beverage preparation machines are known in the state of the art and are widely used for preparing coffee beverages. These automatic machines provide a fully automatic process, starting with storing the roasted coffee beans and ending with the delivery of the coffee beverage into a cup. Differently to a fully automated machine, the system of the invention allows more flexibility by using different accessory-devices, tailored to the right preparation, between the main-devices. Typically, these accessory-devices are devices for espresso, drip coffee, soluble coffee, etc.

Differently to single serve systems (typically those using capsules), the system of the present invention does not use a single packaging for each beverage preparation, but a multipack, and uses accessory-devices for extraction/processing.

These and other objects, which become apparent upon reading the following description, are solved by the subject matter of the independent claim. The dependent claims refer to preferred embodiments of the invention.

SUMMARY OF THE INVENTION

According to a first aspect, the invention relates to a roasting and grinding apparatus for coffee beans comprising a roasting device and an associated grinding device. The roasting device is configured for receiving coffee beans of a certain type that will be roasted, the roasting device comprising reading means to identify the characteristics of the coffee beans dispensed to it. The roasting device further comprises a control unit configuring the roasting profile of the beans according to the characteristics retrieved from the reading means and/or from the characteristics of the beans in a database in this control unit and/or according to the user's input. The roasted coffee beans are dispensed into a beans container, comprising programmable identification means where product parameters of the roasted coffee beans of a certain type are encoded on it by an encoder in the roasting device. The grinding device of the invention comprises one or more housings for receiving one or more beans containers: the grinding device comprises a reader to obtain the information of the product parameters of the roasted coffee beans of the one or more beans containers; the grinding device further comprises a control unit configured to adapt the grinding size and the quantity of roasted coffee beans to be delivered from the coffee beans containers for obtaining a certain coffee quantity and/or a certain coffee blend quantity from each beans container to be grinded according to these product parameters and/or according to a recipes database, and/or according to the user's input.

According to a preferred embodiment of the invention, the characteristics of the coffee beans in the roasting and grinding apparatus of the invention are one or a plurality of the following: coffee beans type, coffee beans origin, batch volume, recommended roasting level or levels, date of harvest, date of production, production data, farmer data, date of expiration, company and or marketing info.

Particularly, the coffee beans received by the apparatus of the invention can be green and/or partially roasted coffee beans.

Moreover, according to a further embodiment of the invention, the coffee beans received by the roasting device comprise identification means with the characteristics of these coffee beans, to be read by the reading means in the roasting device, these identification means being optical identification means, such as a barcode, OID and/or a QR code, and/or electromagnetical identification means such as a RFID tag.

Preferably, the encoder in the roasting device writes on the programmable identification means of a certain container the product parameters of the roasted coffee beans of a certain type, these product parameters comprising the characteristics of the coffee beans and one or a plurality of the following: roasting level, roasting profile, CTN, aroma profile chart, adequate beverage recommendation, roasting date, best limit consumption date.

According to a preferred embodiment, the programmable identification means in the one or plurality of beans containers in the apparatus of the invention comprise a RFID tag.

In the roasting and grinding apparatus for coffee beans according to the present invention, preferably, the quantity of the roasted coffee beans to be grinded, the grinding size and the blend in the grinding device are adapted as a function of the type of beverage to be prepared from the roasted and grinded coffee beans in combination of the product parameters of the roasted coffee beans of the one or plurality of beans containers connected to the grinding device.

Typically, in the roasting and grinding apparatus of the invention, the one or plurality of coffee beans containers have an embedded dosing means to dose only the needed quantity of roasted coffee beans in the grinding device.

According to yet another preferred embodiment of the invention, the grinding device further comprises a motor and a drive to control the embedded dosing means of the one or plurality of coffee beans containers to dose only the needed dose of roasted coffee beans to the grinding device.

Typically, the one or plurality of coffee beans containers in the apparatus of the invention comprise plugging means to be quickly plugged onto the grinding device so they are freely exchangeable (plug & play).

Preferably, the one or plurality of coffee beans containers are locked on top of the grinding device to allow firm fix of the one or plurality of containers during the grinding operation. Typically, the plugging means comprise one or a plurality of: bayonet connection, magnetical connection, electromagnetical connection, clutch system, or the like.

In another embodiment of the apparatus according to the invention, the roasting device comprises a RFID tag encoder to encode the product parameters of the roasted coffee beans of a certain type in the one or plurality of beans containers.

Preferably, the grinding device in the apparatus of the invention comprises a RFID tag reader to obtain the information of the product parameters of the roasted coffee beans of the one or more beans containers connected to it.

According to a second aspect, the invention further relates to a method for roasting and grinding coffee beans using a roasting and grinding apparatus as the one just described, the method comprising the following steps:

dispensing a certain quantity of coffee beans in the roasting device;

reading the characteristics of the coffee beans dispensed;

carrying out a roasting process according to the characteristics read and/or a database information and/or a user's choice or selection;

delivering the roasted coffee beans into a beans container;

encoding the product parameters into the coffee beans container;

attaching a coffee beans container into the grinding device;

reading the product parameters in the coffee beans container;

carrying out the grinding as to grinding size and quantity according to the product parameters read.

Preferably, the method of the invention further comprises the following further steps:

attaching a plurality of coffee beans containers (10, 20) into the grinding device;

reading the product parameters in each of the plurality of the coffee beans containers;

carrying out the grinding as to grinding size and quantity of each of the coffee beans containers according to the product parameters read for each and to the type of beverage to be prepared from the recipes database from the roasted and grinded coffee beans.

According to yet a further object of the invention, it relates to the use of a roasting and grinding apparatus as the one just described, for delivering a blend of roasted and grinded coffee beans in a certain quantity.

Further features, advantages and objects of the present invention will become apparent for a skilled person when reading the following detailed description of non-limiting embodiments of the present invention, when taken in conjunction with the appended drawings.

DESCRIPTION OF A PREFERRED EMBODIMENT

In the following, the invention is described exemplarily with reference to the enclosed figures, in which FIG. 1 is an exemplary functional diagram of a roasting, grinding, extraction system according to an embodiment of the invention.

The main goal of the present invention is to achieve similar end results as the ones achieved with a capsule system without using any single serve packaging, and without specific skills needed. The goal of the invention, as it will be explained in more detail in what follows, is to build main-devices that communicate among them via accessory-devices, that transfer/communicate parameters in order to replace the Barista (skilled person) know-how by an AI (Artificial Intelligence) system.

The system of the present invention adjusts each main-device parameters (inputs), according to the outputs of the main-device used in the previous phase. The goal is to ensure the integrity of the procedure and of the information by communicating the right parameters to be used.

In difference to fully automated machines, the system of the invention further allows more flexibility by using different accessory-devices (tailored to the right preparation: typically accessory devices for Espresso, Drip coffee, Soluble Coffee, etc.) between the main-devices.

In difference to single serve systems (typically preparing a beverage from a capsule or single-dose container), the system of the invention does not use a single packaging for each preparation, but a multipack, and uses accessory-devices for the extraction/processing.

Figure 1:
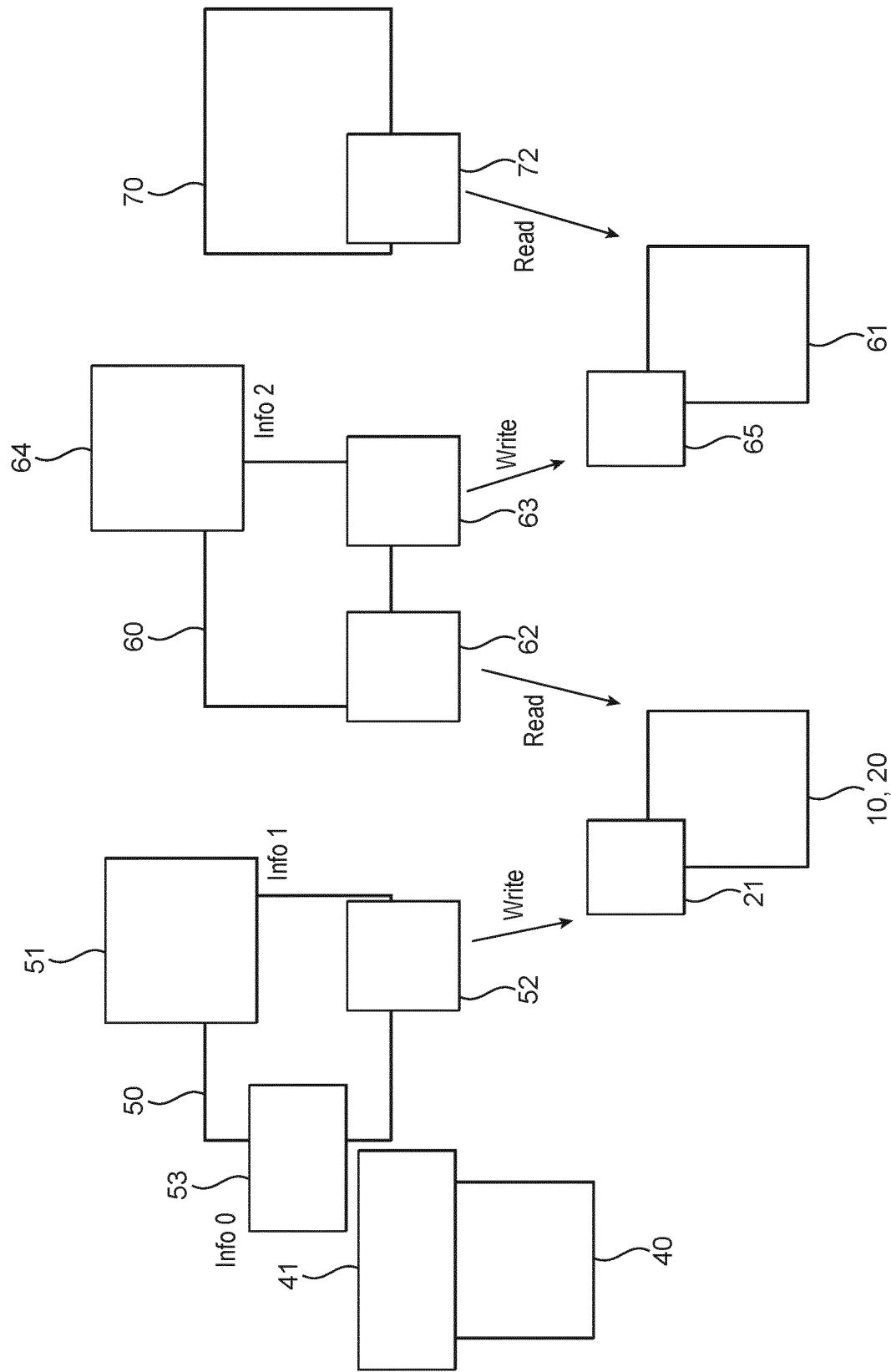

Looking at FIG. 1, it shows a roasting device 50 comprising a reader 53 and an encoder 52. The reader 53 is able to retrieve the information on the identification means 41 of a container 40 comprising coffee beans: these coffee beans can be green or partially roasted or a mixture of the two. The identification means 41 comprise the Information 0 of the coffee beans in the container 40, as represented schematically in FIG. 1. This Information 0 can comprise one or a plurality of the following information: coffee beans type, coffee beans origin, batch volume, recommended roasting level, date of expiration, etc. The identification means 41 in the container 40 can be optical (barcode, QR code, OID) or electromagnetically readable codes (typically, a RFID code). The roasting device 50 further comprises a control unit configuring the roasting profile of the beans according to the characteristics retrieved from the reading means 53 and/or from the characteristics of the beans in a database 51 in this control unit and/or according to the user's input. The roasting device 50 therefore makes the roasting of the green beans, partially roasted beans or the mixture of the two based on this information, and then delivers the roasted coffee beans into a beans container 10, 20. The beans container 10, 20 comprises programmable identification means 21 where product parameters of the roasted coffee beans of a certain type are encoded on it by an encoder 52 in the roasting device. Th information encoded on the beans containers 10, 20 is named as Information 1 in the schematic diagram of FIG. 1, and this Information 1 comprises one or a plurality of the following information: Information 0 as explained above and roasting level, date of roasting, coffee origin, roasting profile, roasting date, etc.

The system of the invention further comprises a grinding device 60 comprising one or more housings for receiving one or more beans containers 10, 20. The grinding device 60 comprises a reader 62 to obtain the information of the product parameters (Information 1) of the roasted coffee beans of the one or more beans containers 10, 20. The grinding device 60 further comprises a control unit configured to adapt the grinding size and the quantity of roasted coffee beans to be delivered from the coffee beans containers 10, 20 for obtaining a certain coffee quantity and/or a certain coffee blend quantity from each beans container to be grinded according to these product parameters (Information 1) and/or according to a recipes database 64, and/or according to the user's input.

The grinded coffee is delivered from the grinding device 60 into a product holder 61: this product holder 61 comprises programmable identification means 65, where the encoder 63 in the grinding device 60 can encode the beverage information (called Information 2). This information will comprise one or a plurality of the following: beverage type, volume of the beverage to prepare, beverage temperature, pump profile, etc. The product holder 61 comprising the beverage information (Information 2) with the grinded coffee, will then be transferred to a preparation or extraction device 70, where the final beverage (the coffee beverage) will be prepared and delivered into a cup. The preparation device 70 comprises reading means 72 able to retrieve the beverage information (Information 2) from the identification means 65 in the product holder 61 and therefore make the beverage preparation (beverage extraction) according to this information.

Figure 2:
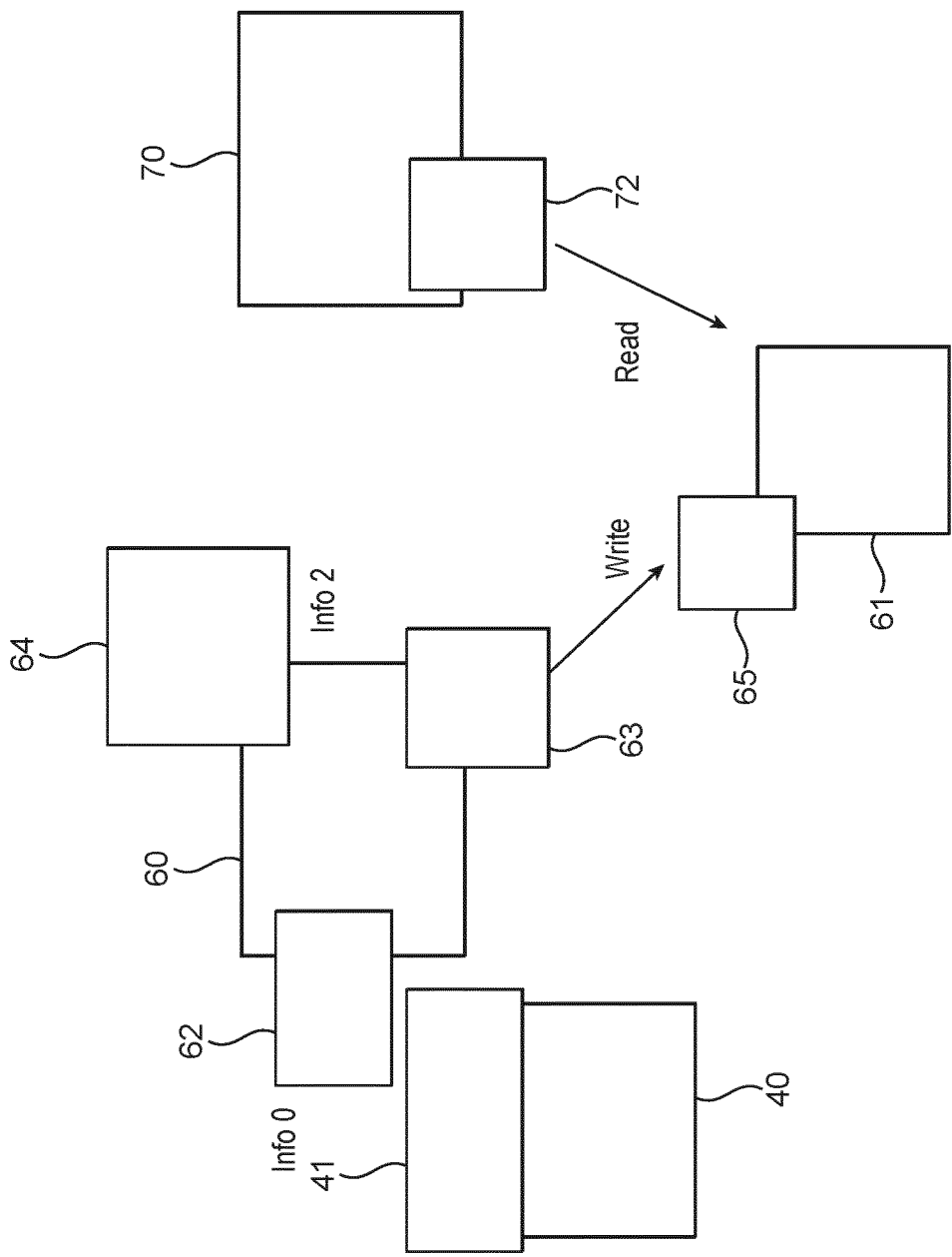
FIG. 2 is an exemplary functional diagram of a dosing, extraction system according to an embodiment of the invention.

Looking now at FIG. 2, an embodiment of the system of the invention is shown, particularly referring to a food product comprised in container 40 in the form of a powder. Similarly, the container 40 will be provided with identification means 41, optical (barcode, QR code, OID) or electromagnetically readable codes (typically, a RFID code) comprising the product information (Information 0 of the product type, such as coffee or milk, etc, and the date of expiration, for example). The system will comprise a dispensing device (60) comprising a reader 62 to retrieve the information on the product from the container 40 and therefore make the dosing according to this information (Information 0). The dispensing device 60 can also be a grinding device, as explained in the previous Figure. According to a preferred embodiment, the powdered product will be comprised in a container 10, 20. The dispensing device 60 further comprises a control unit configured to dispense a certain amount of powdered food or beverage product from a container (either 40 or 10, 20) according to these product parameters (Information 0) and/or according to a recipes database 64 as a function of the beverage to be prepared. The dispensing device 60 further comprises an encoder 63 to encode the beverage information (Information 2) on programmable identification means 65 on a product holder 61 in the dispensing device 60, to where the dispensed powdered food or beverage product is sent. Similarly as to the embodiment described in FIG. 1, the product holder 61 will be transferable into an extraction or preparation device 70 to prepare and dispense the final food or beverage product. The preparation device 70 will comprise a reader 72 to retrieve the beverage information (Information 2) from the identification means 65 in the product holder 61, and prepare the beverage accordingly. This Information 2 will comprise one or a plurality of the following: beverage type, volume of the beverage to prepare, beverage temperature, pump profile, etc.

Figure 3:
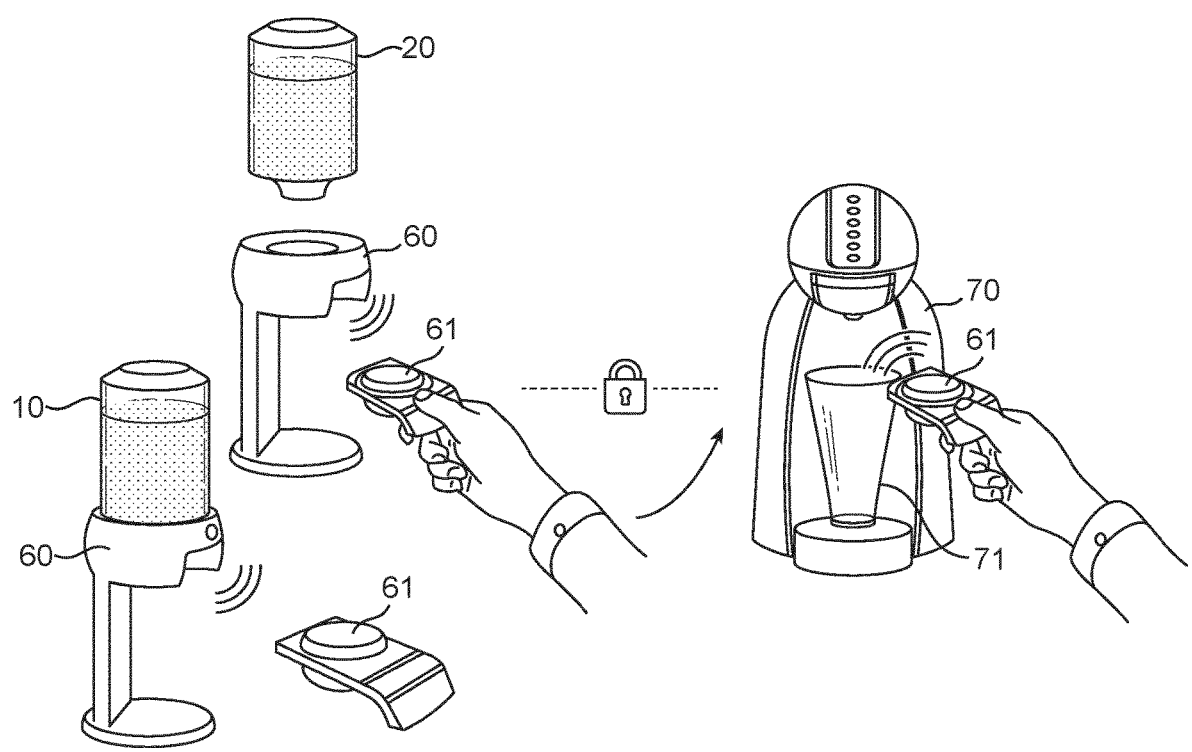
FIG. 3 is a schematic view of a dispensing, extraction system according to an embodiment of the invention.

The embodiment represented functionally in FIG. 2 is shown schematically in FIG. 3: a dispensing device 60 receives a certain product container 10 comprising a certain type of a powder product (milk in powder, for example). The dosing device 60 reads the identification means in this container 10 and so retrieves the product information, therefore knowing which amount of milk powder has to be delivered into the product holder 61 for a certain beverage to be prepared (according to the user's input and/or to the information retrieved in a recipes database 64). A container 20 with another type of powdered product (coffee, for example) is plugged into the dosing device 60. The dosing device will read the information on this product and will deliver the amount needed on the product holder 61 for the beverage to be prepared (according to the user's input and/or to the information retrieved in a recipes database 64). The encoder 63 in the dosing device 60 will then encode the beverage information (Information 2) on the product holder 61 according to the user's input and/or to a recipes database 64. When the product holder 61 will be plugged in a preparation device 70, for the beverage preparation, the Information 2 for the certain beverage extraction will be retrieved by the device 70 so the preparation will be done according to certain parameters.

Figure 4:
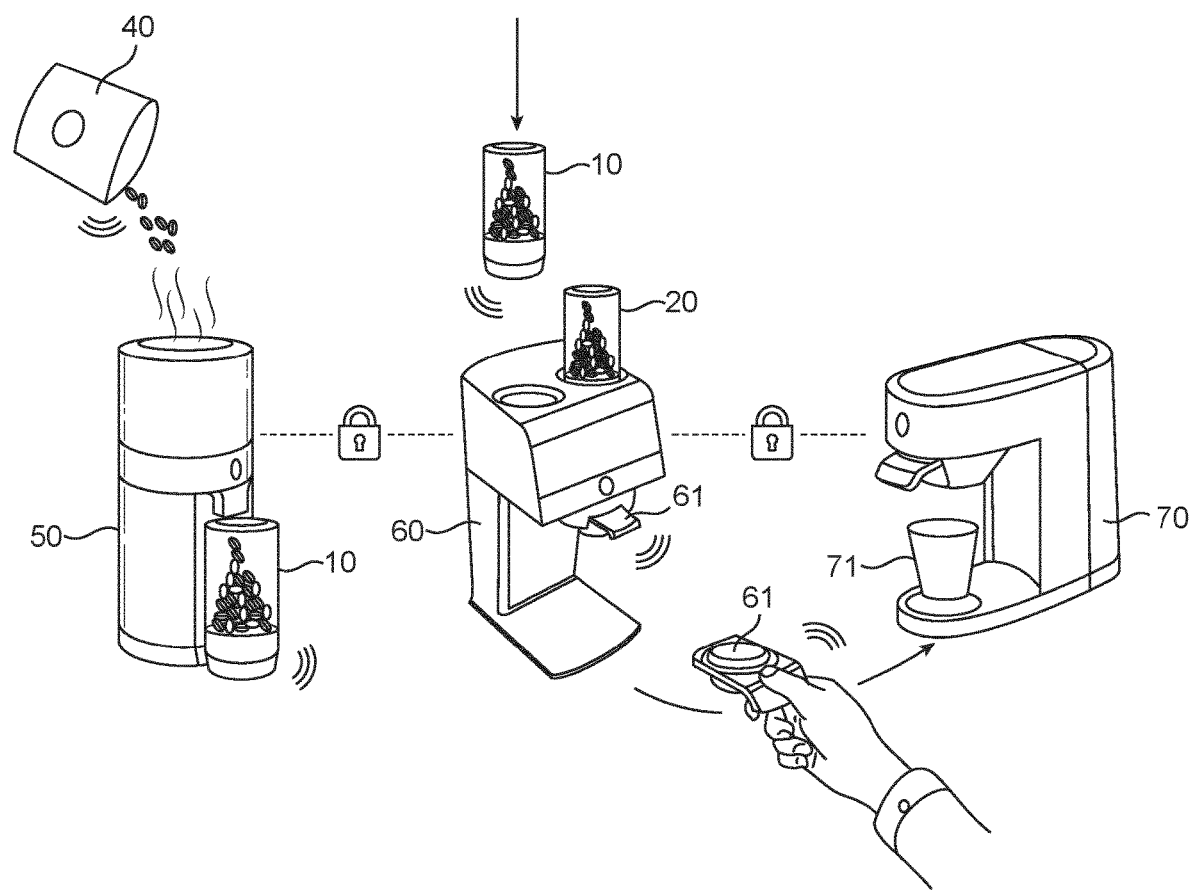
FIG. 4 is a schematic view of a roasting, grinding, extraction system according to an embodiment of the invention.

The functional diagram in FIG. 1 is represented schematically in FIG. 4. A container 40 with coffee beans (green and/or partially roasted) dispenses the beans into a roasting device 50. The Information 0 is read by the roasting device 50 so the roasting takes place according to certain parameters. The roasted coffee beans are delivered in a container 10. Similarly, a different type of coffee beans can be roasted in the roasting device 50 according to different parameters and can be delivered in a container 20. The containers 10, 20 can be plugged into a grinding device 60 where a certain amount of each one of the roasted beans from each of the containers 10, 20 can be sent into a product holder 61. This product holder 61 will be encoded with the beverage information (Information 2) so, when transferred into a dispensing or extraction device 70, the beverage preparation will take place according to certain parameters. The final beverage will be delivered into a cup 71, for example.

Figure 5:
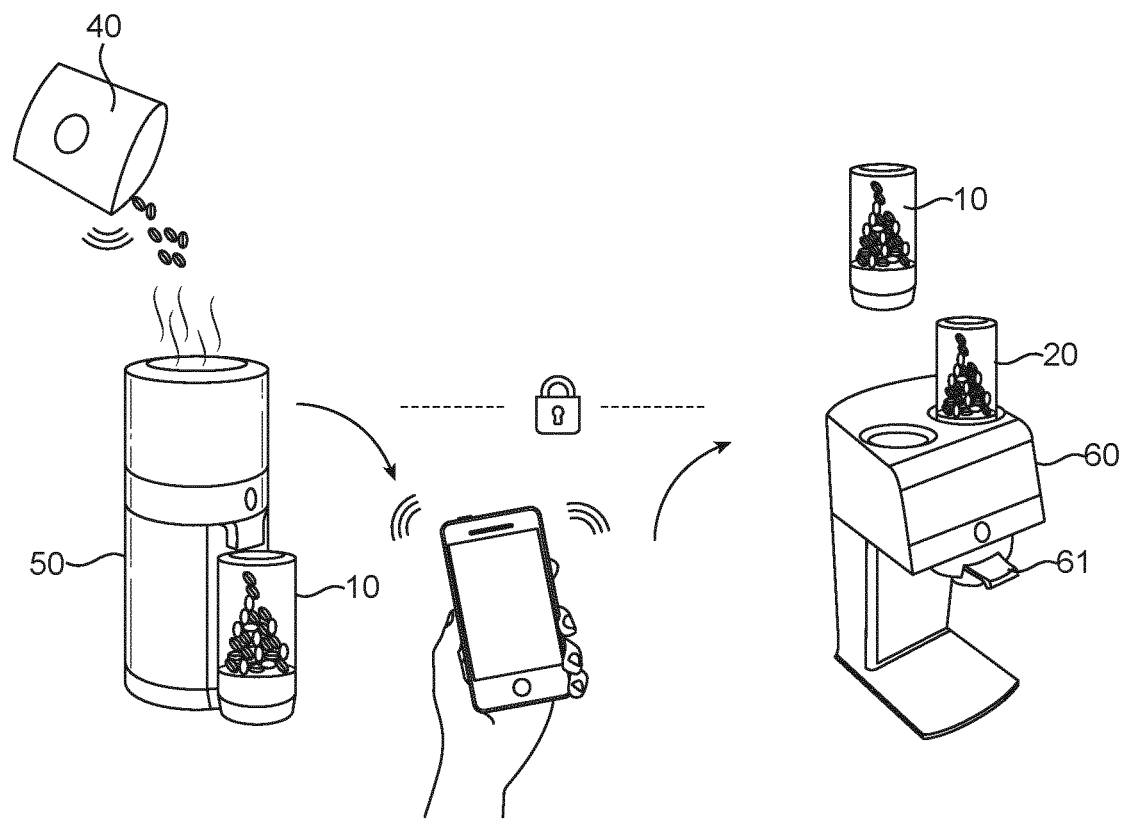
FIG. 5 is a schematic view of a roasting, grinding system according to an embodiment of the invention.

Still another embodiment of the system of the invention is represented in FIG. 5. The roasting device 50 is configured for receiving coffee beans of a certain type from a container 40: these beans will be roasted. The roasting device 50 comprises reading means 53 to identify the characteristics of the coffee beans dispensed to it, and further comprises a control unit configuring the roasting profile of the beans according to the characteristics retrieved from the reading means and/or from the characteristics of the beans in a database in this control unit and/or according to the user input. The roasted coffee beans are sent into a container 10 and are then transferred into a processing device 60. The processing device 60 can be a grinding device where the beans will be grinded (also another certain amount from a different container 20), sent to a product holder 61 that will then be transferred into a beverage preparation device 70 for the final beverage dispensing, or the processing device (not shown) can be a grinding device and a preparation or extraction device (functionalities of the device 60 and 70 together).

The roasting device 50 comprises a data transfer function to communicate product parameters of the roasted coffee beans of a certain type to the coffee processing device (grinding device or grinding and extraction device).

Figure 6:
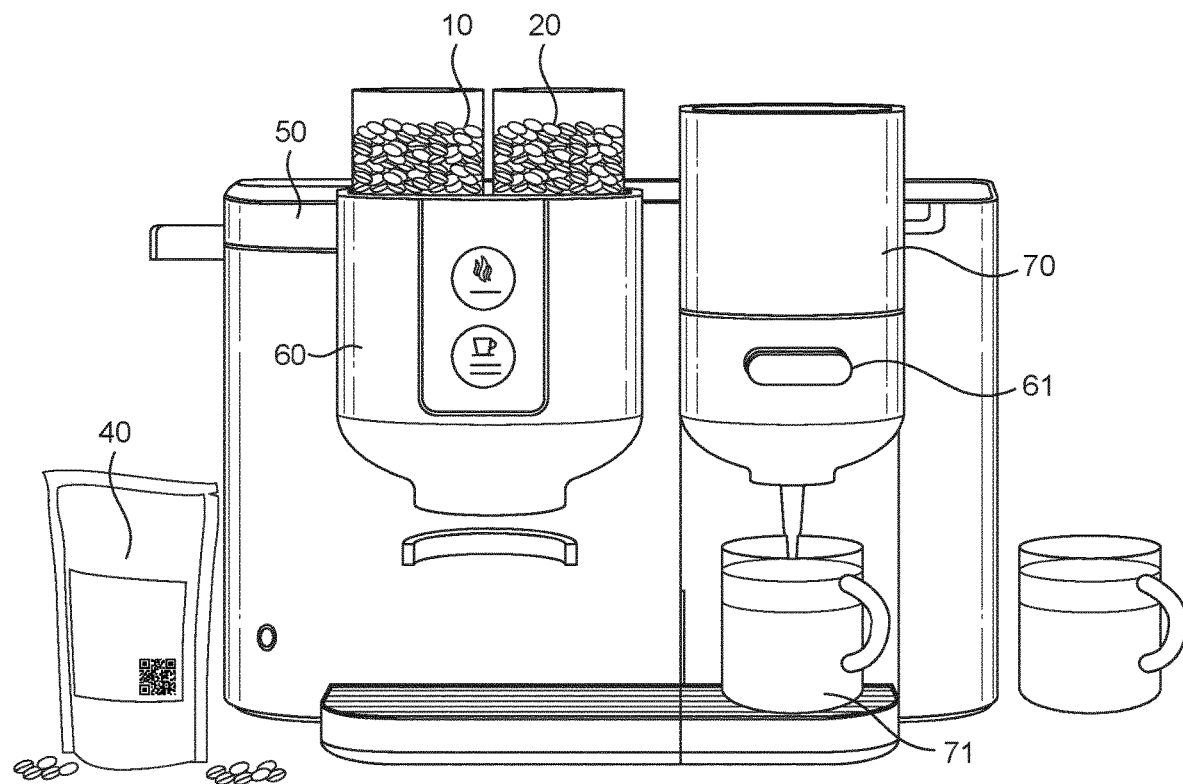
FIG. 6 is a schematic representative view of a roasting, grinding, extraction system according to an embodiment of the invention.

An schematic representation of the system of the invention is shown in FIG. 6. The container 40 comprises coffee beans (green and/or partially roasted) that will be roasted in the device 50 and sent into containers 10, 20 for different types of coffee beans. The containers 10, 20 will be plugged in a grinding device 60 to deliver a certain blend into a product holder 61 that, when plugged in a preparation device 70, will deliver the coffee beverage into a cup 71.

Figure 7:
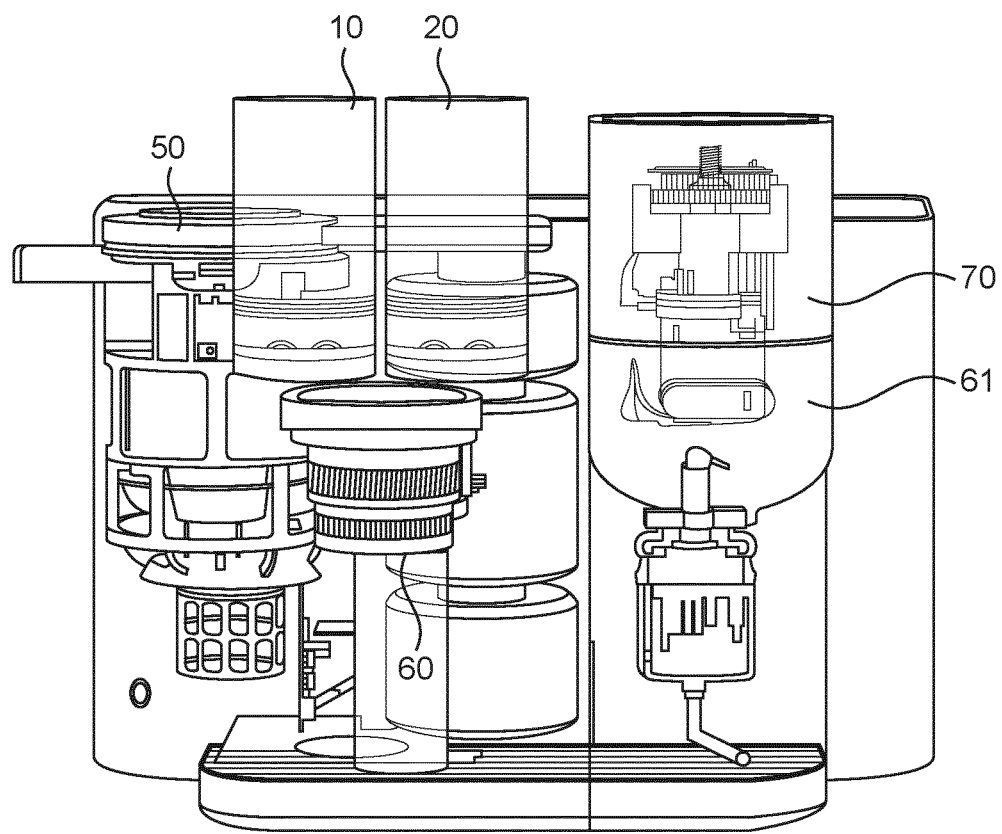
FIG. 7 is a schematic representative view of a roasting, grinding, extraction system according to an embodiment of the invention, showing the different elements belonging to it.

FIG. 7 represents the main components and connections of the system represented in FIG. 6, namely the roasting device 50, the containers 10, 20, the dispensing or grinding device 60 and the preparation or extraction device 70.

Figure 8:
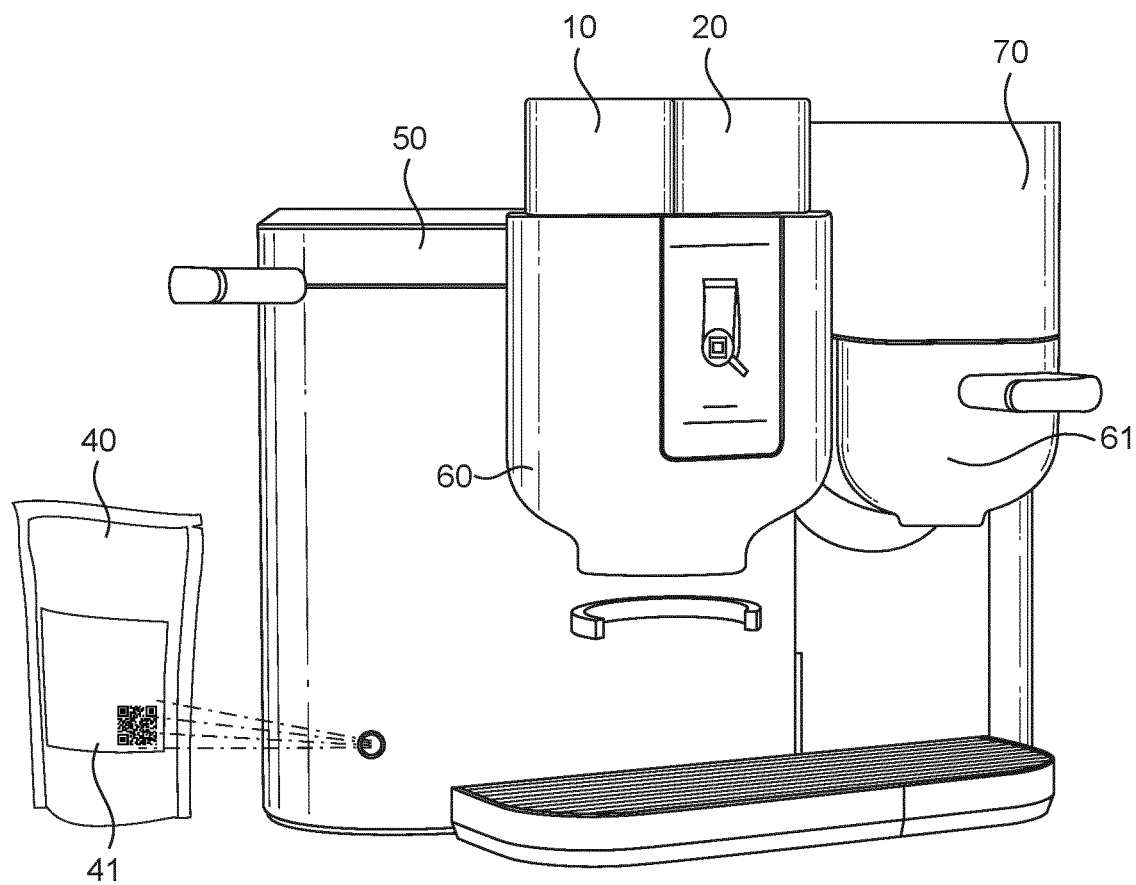
FIG. 8 is a schematic representative view of the roasting, grinding, extraction system in FIG. 7, showing the reading of identification means in the container comprising the coffee beans.

FIG. 8 shows the identification means 41 in the container 40 comprising the coffee beans. These identification means 41 will comprise the information on the coffee beans type and/or origin and/or the batch volume and/or date of expiration and/or recommended roasting level, amongst other information. The reading means 53 in the roasting device 50 will retrieve this information and will consequently do the roasting according to certain parameters.

Figure 9:
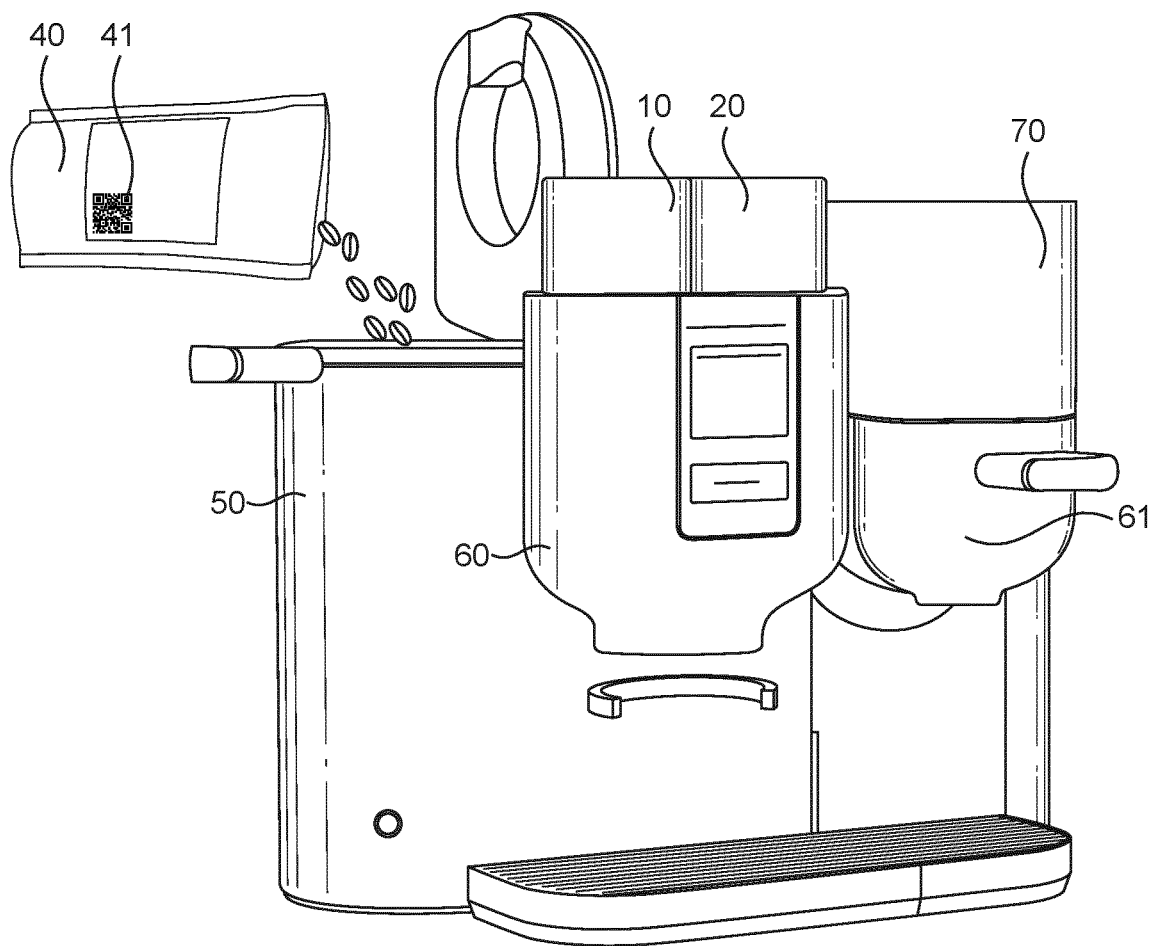
FIG. 9 is a schematic representative view of the roasting, grinding, extraction system in FIG. 7, showing the delivery of the coffee beans into the roasting device.
Figure 10:
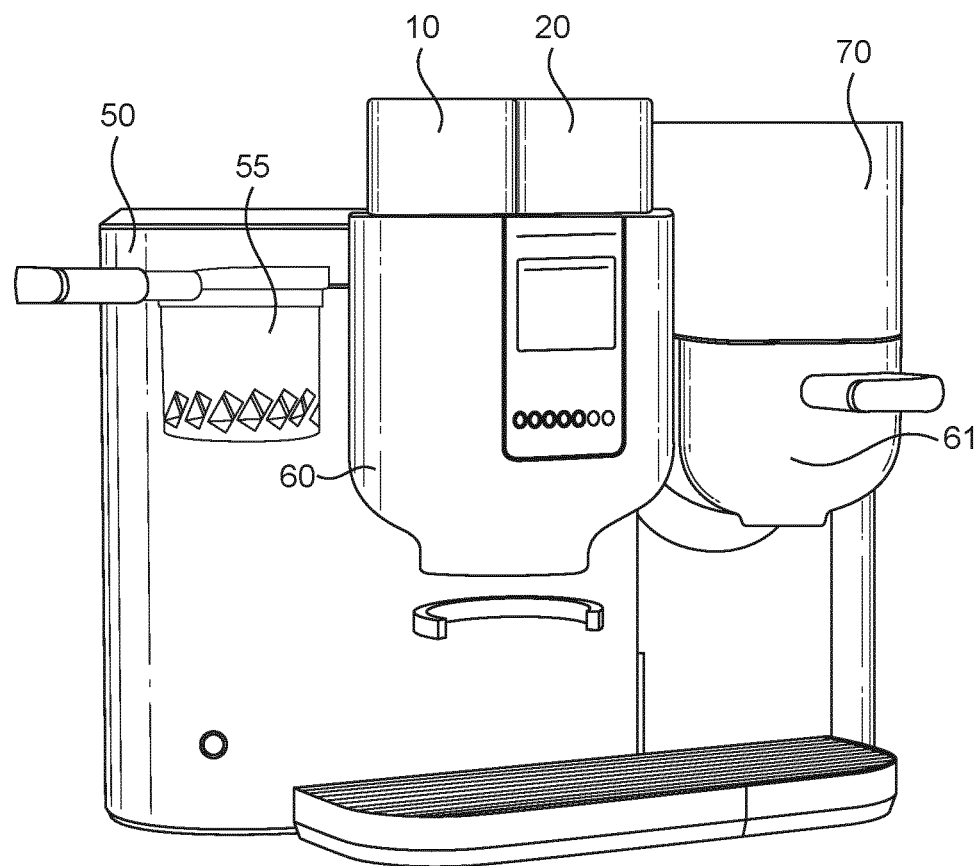
FIG. 10 is a schematic representative view of the roasting, grinding, extraction system in FIG. 7, showing the process of roasting the coffee beans in the roasting device.

FIG. 9 shows the beans from the container 40 being delivered into the roasting device 50 for being roasted, before being sent to one of the containers 10, 20 and then to the grinding device 60. FIG. 10 shows the roasting step of the beans (green and/or partially roasted) in the roasting device 50.

Figure 11:
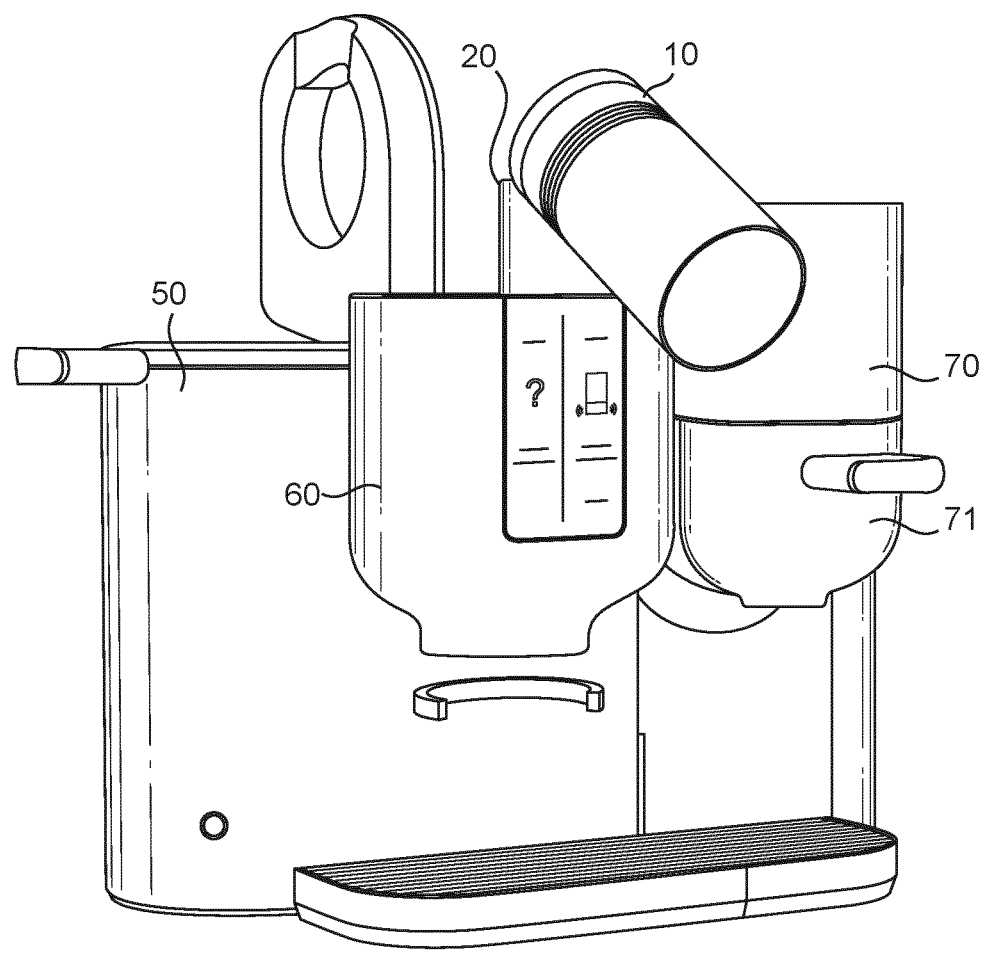
FIG. 11 is a schematic representative view of the roasting, grinding, extraction system in FIG. 7, showing the plugging of a container in the grinding or dispensing device.
Figure 12:
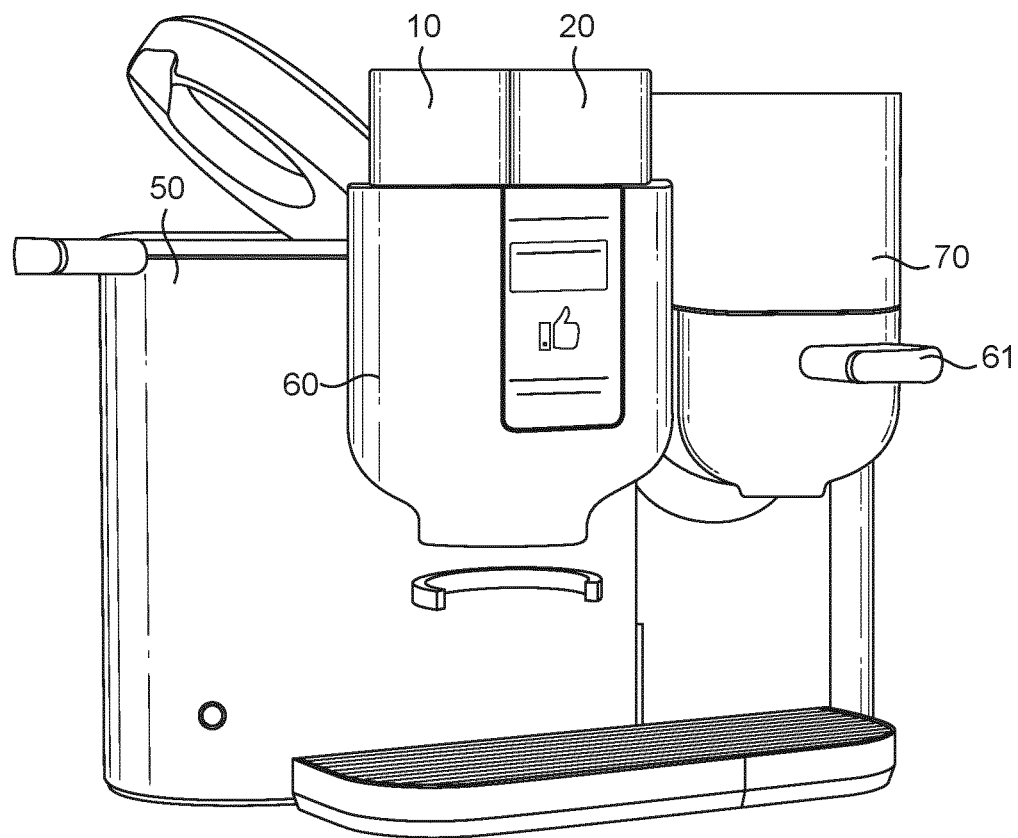
FIG. 12 is a schematic representative view of the roasting, grinding, extraction system in FIG. 7, showing two containers plugged in the grinding or dispensing device.
Figure 13:
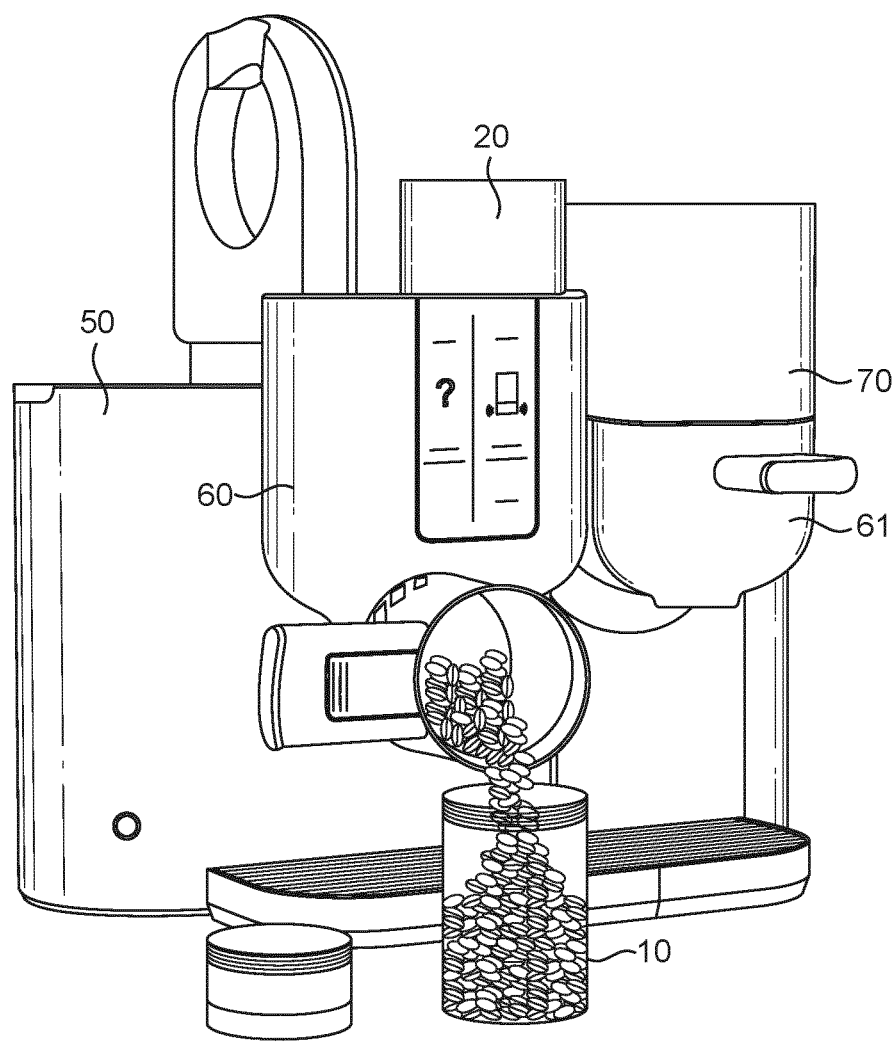
FIG. 13 is a schematic representative view of the roasting, grinding, extraction system in FIG. 7, showing the reading of identification means in the container comprising the coffee beans.
Figure 14:
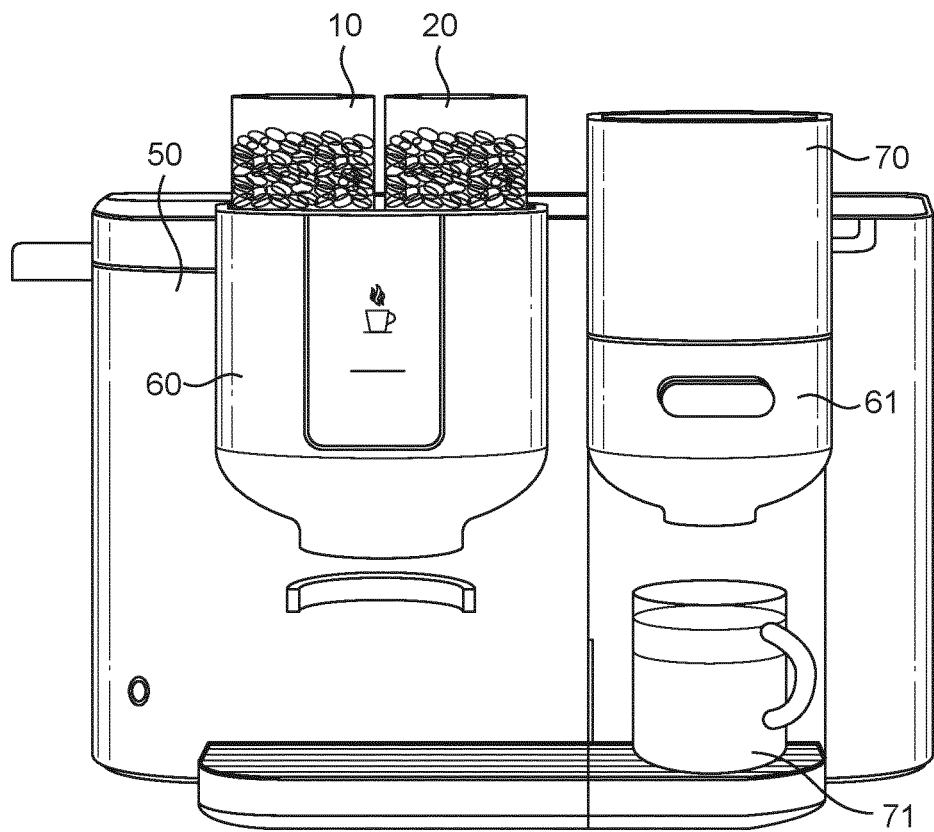
FIG. 14 is a schematic representative view of the roasting, grinding, extraction system in FIG. 7, showing the beverage finally dispensed in a cup.

The roasting device 50 opens (FIG. 12) and one of the containers 10 or 20 plugged in the grinding device 60 is unplugged from it (FIG. 11) so it can receive the roasted beans coming from the roasting device 50 (FIG. 13). Typically, the roasting device 50 will comprise a removable basket to where the unroasted and/or partially roasted beans are delivered from the container 40 and where they are later roasted. The basket will be able to be removed from the roasting device 50 and then the roasted beans can be sent into a container 10 or 20 that will be later plugged into a grinding device 60 (FIG. 14).

Figure 15:
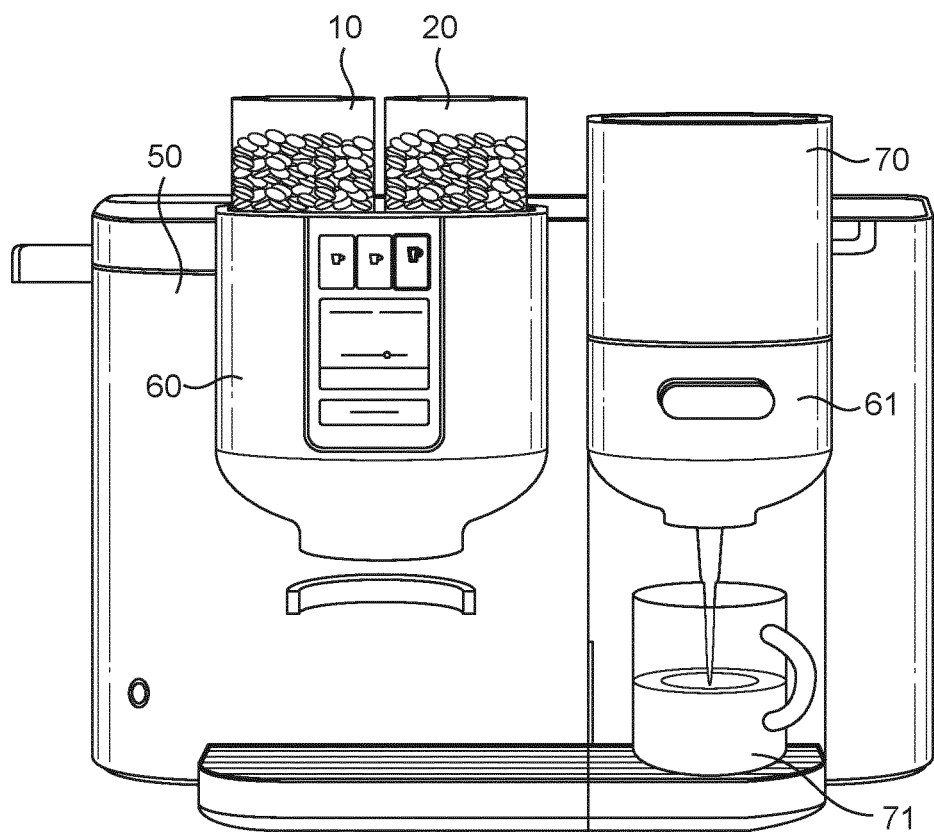
FIG. 15 is a schematic representative view of the roasting, grinding, extraction system in FIG. 7, showing the dispensing of the beverage in a cup.
Figure 16:
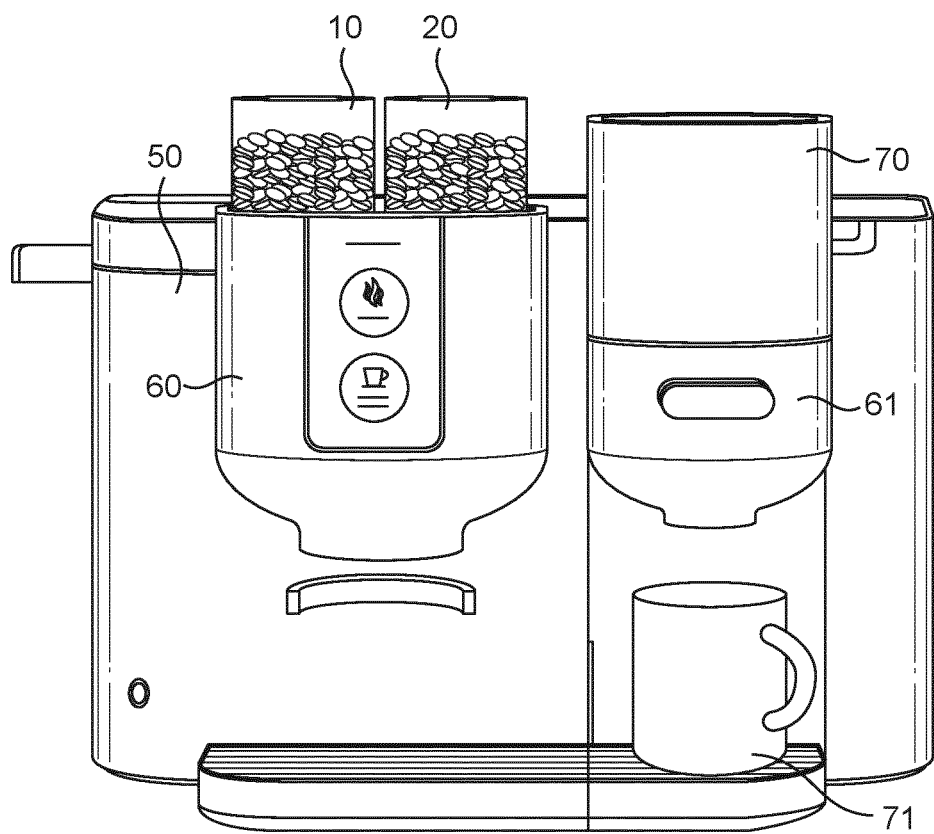
FIG. 16 is a schematic representative view of the roasting, grinding, extraction system in FIG. 7, showing the system prepared for dispensing a beverage.
Figure 17:
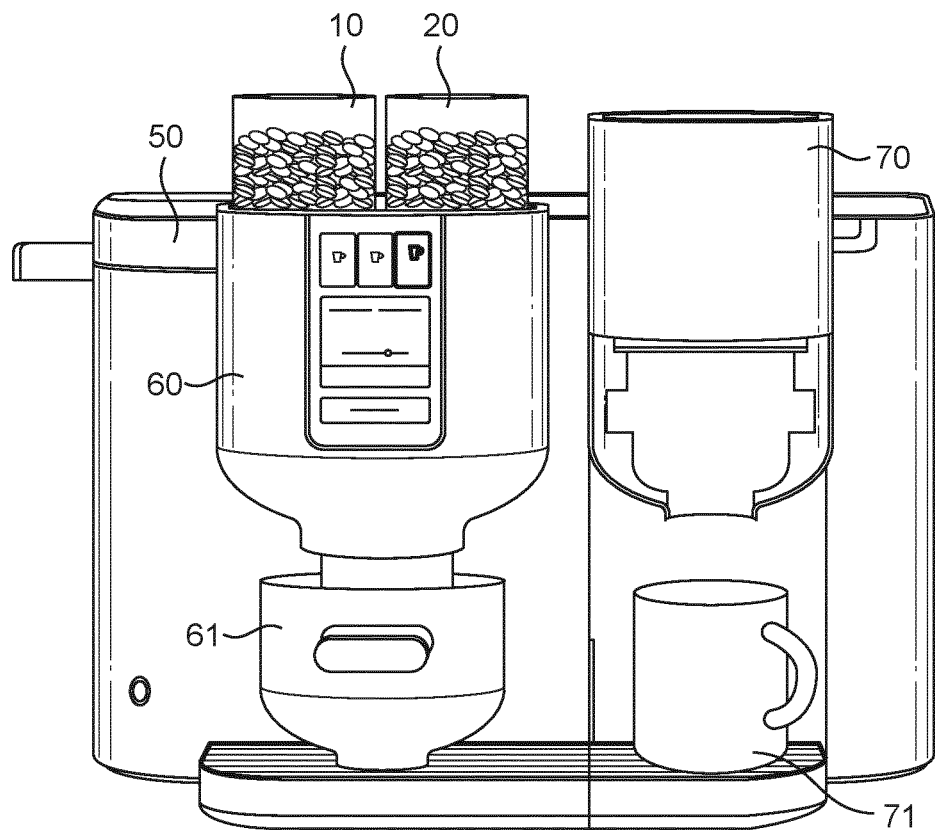
FIG. 17 is a schematic representative view of the roasting, grinding, extraction system in FIG. 7, showing the dispensing of grinded coffee for the further preparation of a beverage.
Figure 18:
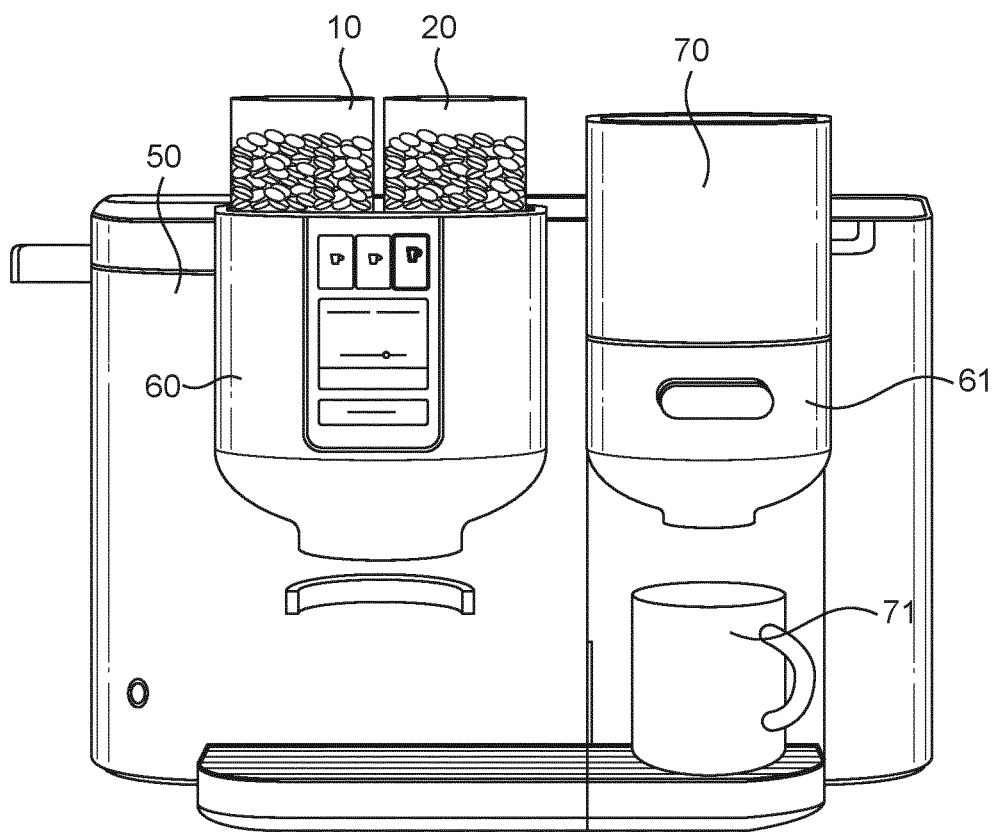
FIG. 18 is a schematic representative view of the roasting, grinding, extraction system in FIG. 17, showing the grinded coffee arranged in the preparation device, ready to prepare a beverage.

FIG. 16 shows schematically the roasting step in the system of the invention. Once the roasting is finished, grinding takes place (FIG. 18) and the grinded coffee (coffee blend) is sent into a product holder 61 (FIG. 17) that will be then plugged into a preparation or extraction device 70: the beverage preparation in the preparation or extraction device 70 and its delivery into a cup 71 is sown in FIG. 15.

Figure 19:
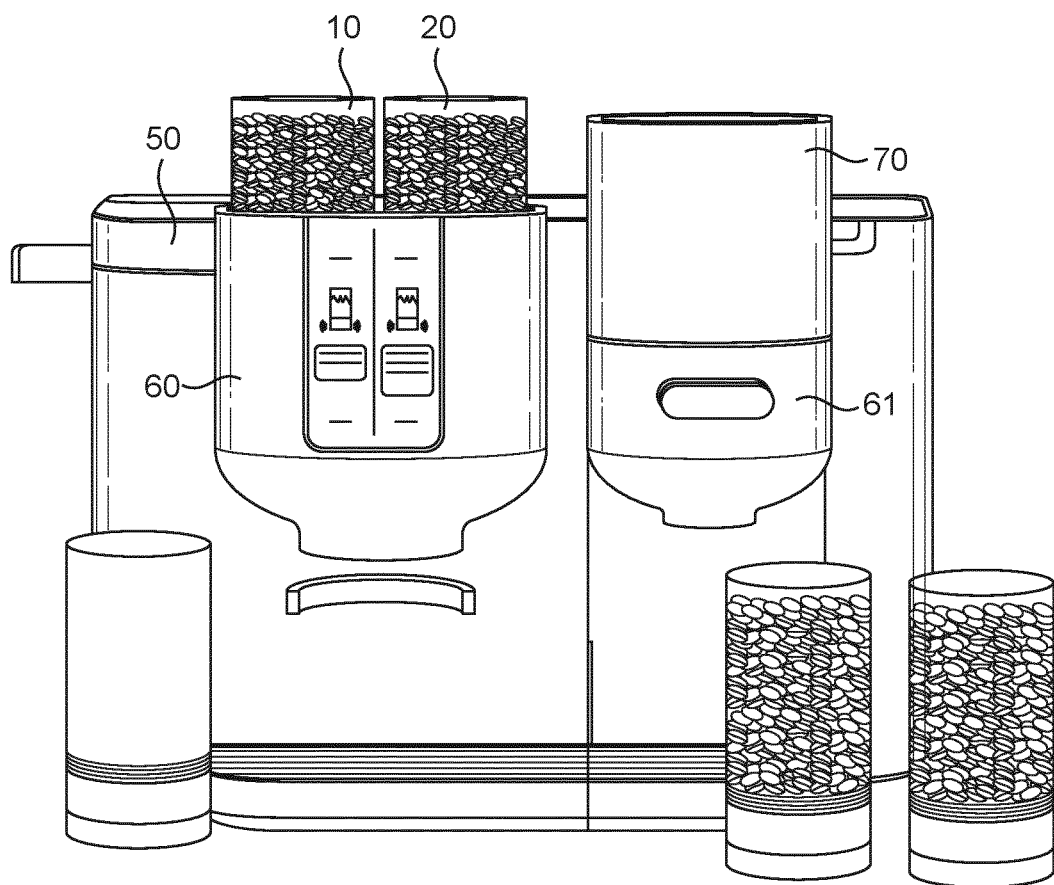
FIG. 19 is a schematic representative view of the roasting, grinding, extraction system in FIG. 7, showing the possibility of plugging in the grinding device several containers comprising different types of coffee beans.
Figure 20:
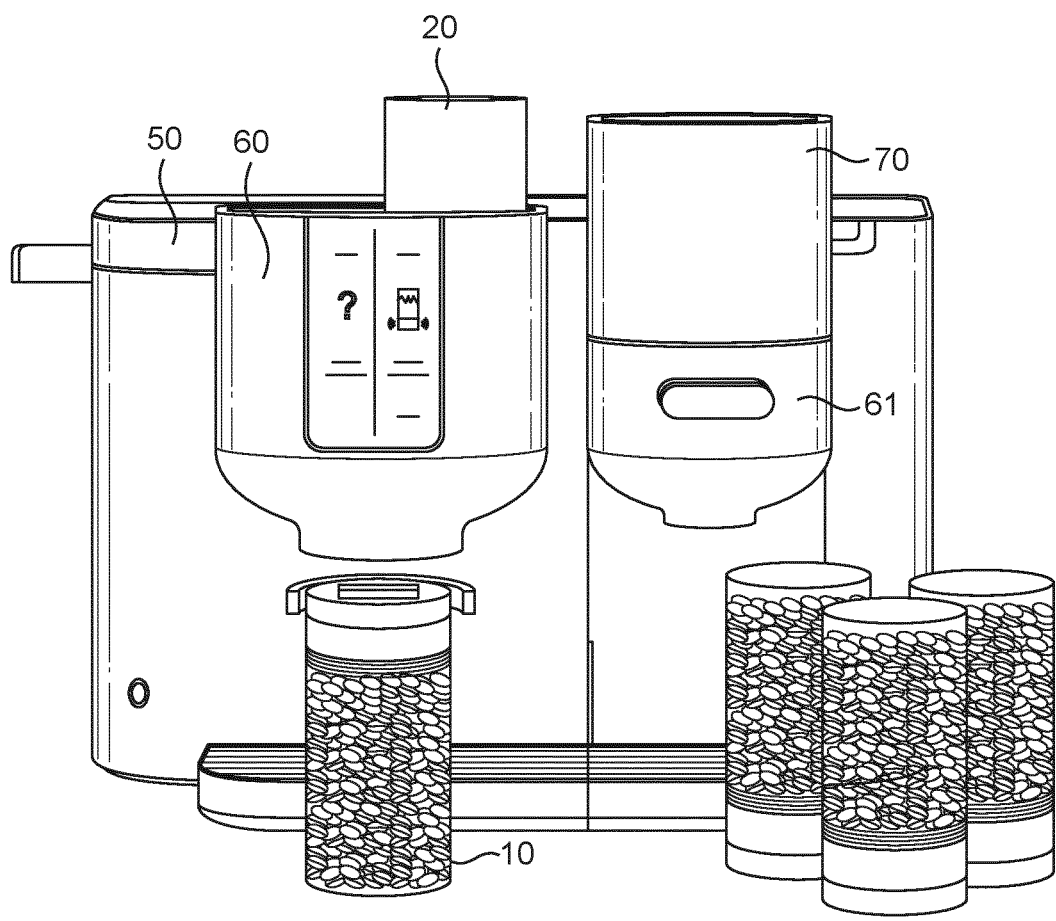
FIG. 20 is a schematic representative view of the roasting, grinding, extraction system in FIG. 7, showing different containers comprising different types of coffee beans that can be plugged in the grinding device in order to obtain different coffee blends.

FIGS. 19 and 20 show schematically different types of coffee beans that can be in different containers 10, 20 so different coffee blends can be prepared. The system of the invention allows a high versatility and the containers 10, 20 can be quickly plugged and unplugged in the grinding or dispensing device 60 (plug and play type system).

According to a second object, the invention relates to a method for roasting and grinding coffee beans using a roasting and grinding apparatus as the one described.

According to a third object, the invention further relates to the use of a roasting and grinding apparatus as the one described for delivering a blend of roasted and grinded coffee beans in a certain quantity.

It should be clear to a skilled person that the embodiments shown in the figures are only preferred embodiments, but that, however, also other designs of a system can be used.

The invention claimed is:

1. A roasting and grinding system for coffee beans comprising:
   a roasting device configured for receiving coffee beans from a first container and roasting the coffee beans, the roasting device comprising a first reader configured to read an optical or electromagnetically readable code of the first container to identify a characteristics of the coffee beans, the roasting device further comprising a roasting device control unit to configure a roasting profile of the coffee beans, wherein the roasting profile is configured according to;
   (a) the characteristics identified by the first reader,
   (b) an additional characteristics of the coffee beans in a database in the roasting device control unit,
   (c) a user input, or
   (d) any combination of (a), (b), and/or (c),
   wherein the roasting device is further configured to dispense roasted coffee beans into one or more beans containers, wherein the roasting device further comprises an encoder configured to encode a product parameter of the roasted coffee beans on a programmable identification means of the one or more beans containers;
   the one or more beans containers configured to receive the roasted coffee beans from the roasting device, wherein the one or more beans containers comprise the programmable identification means;
   a grinding device comprising one or more housings for receiving the one or more beans containers, the grinding device comprising a second reader to obtain the product parameter of the roasted coffee beans from the programmable identification means of the one or more beans containers, the grinding device further comprising a grinding device control unit configured to adapt a grinding size and a quantity of roasted coffee beans to be delivered from the one or more beans containers for obtaining a certain coffee quantity and/or a certain coffee blend quantity from each of the one or more beans containers to be grinded according to:
   (e) the product parameters,
   (f) a recipes database,
   (g) an additional user input, or
   (h) any combination of (e), (f), and/or (g).

2. The system of claim 1 wherein the characteristics of the coffee beans is selected from the group consisting of: coffee beans type, coffee beans origin, batch volume, recommended roasting level or levels, date of harvest, date of production, production data, farmer data, date of expiration, company and marketing info, and combinations thereof.

3. The system of claim 1 wherein the coffee beans are green before being roasted by the roasting device.

4. The system of claim 1 wherein the optical or electromagnetically readable code of the first container comprises an OID, a barcode, a QR code, a RFID tag, or a combination thereof.

5. The system of claim 1 wherein the product parameter comprises the characteristics of the coffee beans and one or a plurality of the following: roasting level, roasting profile, CTn, aroma profile chart, adequate beverage recommendation, roasting date, best limit consumption date.

6. The system of claim 1 wherein the programmable identification means comprises a RFID tag.

7. The system of claim 1, wherein the quantity of the roasted coffee beans to be grinded, the grinding size and the blend in the grinding device are adapted as a function of the type of beverage to be prepared from the roasted and grinded coffee beans in combination with the product parameters of the roasted coffee beans of obtained from the programmable identification means of the one or more beans containers connected to the grinding device.

8. The system of claim 1 wherein the one or more beans containers have an embedded doser to dose a dose of roasted coffee beans in the grinding device.

9. The system of claim 8 wherein the grinding device comprises a motor and a drive to control the embedded doser of the one or more beans containers to dose the dose of roasted coffee beans to the grinding device.

10. The system of claim 1 wherein the one or more beans containers comprise a plug to be plugged onto the grinding device so that the one or more beans containers are freely exchangeable.

11. The system of claim 10 wherein the one or more beans containers are lockable on top of the grinding device to allow the one or more beans containers to be fixed during the grinding operation.

12. The system of claim 10 wherein the plug is selected from the group consisting of: bayonet connection, magnetic connection, electromagnetic connection, and clutch system.

13. The system of claim 1 wherein the encoder comprises a RFID tag encoder.

14. The system of claim 1 wherein the second reader comprises a RFID tag reader.

15. A method for roasting and grinding coffee beans using a roasting and grinding system comprising the following steps:
   dispensing a quantity of coffee beans from a first container into a roasting device comprising a first reader;
   reading an optical or electromagnetically readable code of the first container using the first reader to identify a characteristics of the coffee beans dispensed into the roasting device;
   carrying out a roasting process according to: (a) the characteristic identified using the first reader, (b) a database information, (c) a user's choice or selection, or (d) any combination of (a), (b), and/or (c);
   delivering the roasted coffee beans into a beans container;
   encoding a product parameters into a programmable identification means of the beans container using an encoder of the roasting device;
   attaching the beans container into a grinding device;
   reading the product parameter from the beans container using a second reader of the grinding device; and
   carrying out grinding and adapting grinding size and quantity according to the product parameter.

16. The method of claim 15, the method comprising the following further steps:

attaching a plurality of beans containers into the grinding device, wherein the plurality of beans containers are attached to the grinding device at the same time;
reading the product parameters in from each of the plurality of beans containers; and
carrying out the grinding while adapting grinding size and quantity of each of the beans containers according to the product parameters read from each and also adapting the grinding size and quantity according to a type of beverage to be prepared using a recipes database.

* * * * *